(12) United States Patent  
Chaudhuri et al.

(10) Patent No.: US 6,856,611 B2
(45) Date of Patent: Feb. 15, 2005

(54) RADIO INTERFACE SYNCHRONIZATION

(75) Inventors: Siddhartha Ray Chaudhuri, San Diego, CA (US); Chih-Ping Hsu, San Diego, CA (US); Chalapathi Rao Emani, San Diego, CA (US); Jeremy H. Lin, San Diego, CA (US); Gurdeep Singh, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 152 days.

(21) Appl. No.: 10/413,175

(22) Filed: Apr. 11, 2003

(65) Prior Publication Data

US 2004/0017777 A1 Jan. 29, 2004

Related U.S. Application Data

(60) Provisional application No. 60/372,296, filed on Apr. 11, 2002, and provisional application No. 60/388,705, filed on Jun. 13, 2002.

(51) Int. Cl.[7] .............................................. H04B 7/216
(52) U.S. Cl. ...................... 370/335; 370/342; 370/350; 370/503; 455/442
(58) Field of Search ................................. 370/328–332, 370/335, 342, 350, 503; 455/421, 436, 437–444

(56) References Cited

U.S. PATENT DOCUMENTS 5,828,659 A    10/1998  Teder et al. ................. 370/328
6,539,004 B1 *  3/2003  Sawyer ....................... 370/331
6,584,087 B1 *  6/2003  Czaja et al. ................ 370/335
6,788,959 B2 *  9/2004  Jokinen et al. ........... 455/552.1

OTHER PUBLICATIONS

Universal Mobile Telecommunications System; Synchronization in Utran Stage 2, Jun. 2001, pp. 1–44, XP002189086.
Wheatley C: Self–Synchronizing a CDMA Cellular Network:, Microwave Journal, Horizon House, Dedham, US., vol. 42, No. 5, May 1999, p. 320, 322, 324, 326, 328, XP000913206.

* cited by examiner

Primary Examiner—Frank Duong
Assistant Examiner—Melanie Jagannathan
(74) Attorney, Agent, or Firm—Philip R. Wodsworth; Charles D. Brown; George C. Poppas

(57) ABSTRACT

Various techniques are disclosed for unambiguously determining and tracking frame offset in asynchronous wireless communication user equipment. The user equipment determines the unambiguous connection frame number of a downlink channel. The equipment then determines frame timing information for neighbor cells. The frame timing information for the primary common control physical channel and uplink dedicated physical channels is determined. The frame timing is determined as a coarse resolution frame offset in conjunction with a fine resolution chip offset. The frame numbering information for the uplink and downlink dedicated physical channels and the primary common control physical channel is also determined. Then the frame number and timing information is updated using a counter accurate to one chip resolution. The frame offset is updated if the number of chips underflows or overflows a predetermined window. Frame timing may be updated by updating only the fine chip offset or may be completely determined.

21 Claims, 8 Drawing Sheets

RADIO INTERFACE SYNCHRONIZATION

RELATED APPLICATIONS

This application claims priority to U.S. Provisional Application Ser. No. 60/372,296, filed on Apr. 11, 2002, and U.S. Provisional Application Ser. No. 60/388,705, filed on Jun. 13, 2002.

FIELD

The invention relates to wireless communication. More particularly, the invention relates to radio interface synchronization in an asynchronous wireless communication device.

BACKGROUND AND RELATED ART

Wireless phones have enabled mobile communications over wide geographic areas. A wireless phone is not constrained to any particular geographic location, but is only limited by the coverage areas supported by a compatible communication system. Many different systems have been established for wireless communications. Wireless phone systems may be based on code division multiple access (CDMA), time division multiple access (TDMA), orthogonal frequency division multiplexing (OFDM), frequency modulation (FM), or some other modulation techniques. Some communication systems and some wireless phones are able to operate using one or more of the modulation techniques. Each of the different communication systems may operate in accordance with one or more distinct communication standards.

A wireless phone may be configured to operate in a Universal Mobile Telecommunications System (UMTS). The UMTS may be a third generation or higher wireless communication system such as a third generation CDMA wireless communication system or a Global System for Mobile communications (GSM) wireless communication system. There may be one or more specifications for a UMTS.

For example, a wireless communication device may be designed to support one or more GSM standards, such as the standards offered by the "3rd Generation Partnership Project (3GPP)" and embodied in the 3GPP specification where the term "3GPP specification" refers to all GSM specifications including those covering GSM Evolution (GSM EDGE), Global Packet Radio Service (GPRS), and GSM 3G, including implementations for a Universal Mobile Telecommunications System (UMTS). The 3GPP specification is provided in a set of documents provided by Technical Specification Groups (TSG) including specifications in series 01 through 13 for GSM only prior to Rel-4, series 21 through 35 for 3G/GSM R99 and later, and series 41 through 52 for GSM only for Rel-4 and later.

Nearly all of the wireless communication systems support some type of handoff or hand over. In a handoff, a mobile wireless terminal, also referred to as user equipment (UE), user terminal, mobile device, mobile unit, mobile terminal, wireless device, or wireless phone, senses that it is nearing the edge of a coverage area supported by a first transceiver. However, there may be a second transceiver that can provide a higher quality of service for communications with the user equipment. Thus, the communication system hands off the communication with the user equipment from the first transceiver to the second transceiver.

Hand off, or hand over as it is commonly referred, may be accomplished in a variety of ways. One method of handoff is termed a "hard handoff". In a hard handoff, the communication link between the first transceiver and the user equipment is broken before the communication link is established between the second transceiver and the user equipment. Typically, the period in which the user equipment has no communication link to the system is short enough to be not noticeable by a user during a call.

A second method of handoff is termed a "soft handoff". In a soft handoff, or soft hand over, the user equipment establishes communication with the second transceiver before the communication link to the first transceiver is broken. Thus, in a soft hand over the user equipment communicates simultaneously with two transceivers. The transceivers involved in the soft hand over transmit duplicate information to the user equipment. For example, during a voice call, the two transceivers transmit identical voice call information to the user equipment. The user equipment may be able to combine the signals from the two transceivers to create a single higher quality signal because identical information is being sent from two transceivers.

A third method of handoffs is termed "softer handoff". Softer handoff, or softer hand over, refers to a soft hand over between multiple sectors of a single transceiver. In softer hand over, a single transceiver may provide a coverage area using multiple antennas. Each of the antennas may provide coverage for a sector within the aggregate coverage area supported by the single transceiver. A softer hand over essentially operates identically to a soft hand over, except that the hand over is between different sectors and not different transceivers.

User equipment typically continually searches for and synchronizes with signals from neighboring transceivers such that when a hand over is initiated, the user equipment is able to communicate with the new transceiver. Additionally, the user equipment may assist in the process of determining when a soft hand over should be initiated and the transceiver to which the communication link should be handed. Thus, the user equipment not only needs to continually search for and synchronize with neighboring transceivers, the user equipment also needs to continually evaluate the signals from neighboring transceivers in order to assist in determining whether a hand over should occur.

Thus, during a soft hand over and a softer hand over the user equipment simultaneously communicates with two different signal sources. Each of the signal sources transmits some information that may be identical. The user equipment may combine the two signals to create a higher quality combined signal. However, the two transmitted signals originate from two different sources. The two signal sources may be different antennas or different transceivers. The two signal sources may not be identically synchronized. That is, a first transceiver may transmit a signal to the user equipment slightly ahead of the time the second transceiver transmits the identical signal. Additionally, the propagation paths from the first transceiver to the user equipment are likely different from the propagation paths from the second transceiver to the user equipment. Thus, even if the signals from the first transceiver were synchronized with the signals from the second transceiver at the time of transmission, the signals may still arrive at the user equipment at different times due to path differences.

Thus, what is needed is a manner of determining the timing offset of the signals received from the second transceiver relative to the signals received from the first transceiver. In asynchronous wireless communication systems, such as systems covered under the UMTS Terrestrial Radio Access Network (UTRAN) or 3GPP specifications, the transmitted signals are configured as frames. Each of the frames has a corresponding frame number. It is desirable to unambiguously determine frame numbers of channels that are being set up for a soft hand over. It is also desirable to determine a time offset of the signals from sources that may be used in a soft hand over.

SUMMARY

The present disclosure describes techniques for determining frame offsets. An offset determination is performed as a complete determination followed by a partial re-determination and update. In this manner, a complete determination does not need to be performed each time a value of the frame offset is desired.

In one embodiment of the invention, an offset of a channel relative to a reference channel is determined. A complete frame offset determination is initially performed. The complete frame offset determination includes a determination of an offset of an integer number of full frames and a determination of an offset of a fractional number of full frames. The fractional number of frames typically defines a fraction less than one of a full frame duration. The total offset may be characterized as the sum of the full frame offset with the fractional frame offset. Once the complete offset determination has been completed, a periodic re-determination of the fractional frame offset may be performed. Then, the full frame offset may be updated based at least in part on the re-determined fractional frame offset.

The full frame offset may be updated in this manner so long as the last fractional frame offset re-determination has been performed recently. The decision to perform a re-determination of the fractional frame offset and an update of the full frame offset is determined, based in part, on the value of a timer. If the timer has expired, the re-determination of the fractional frame offset is not performed and a complete determination is performed. However, if the timer has not expired, the re-determination and update may be performed.

BRIEF DESCRIPTION OF THE DRAWINGS

The features, objects, and advantages of the invention will become more apparent from the detailed description set forth below when taken in conjunction with the drawings in which like reference characters identify correspondingly throughout and wherein.

DETAILED DESCRIPTION

Various techniques for determining offsets of multiple channels are disclosed herein. These techniques allow for determining a timing offset of a channel relative to a reference channel. In one embodiment, user equipment is configured to determine frame offset parameters between signals from a serving transmitter with those of a neighboring transmitter. The user equipment is configured to determine frame offset parameters, such as OFF and Tm, used in association with soft handovers between base stations in an asynchronous wireless communication system.

The frame offset may be denoted in terms of a number of full frames offset and fractional frames offset. Once an initial determination of the offsets has been performed, the user equipment may be configured to update the offset parameters to re-determine the fractional frame offset and update the number of full frames offset based in part on the value of the re-determined fractional frame offset. The full frames offset is determined to be some positive integer number of frames and the fractional offset is a fraction of a full frame, when added to the full frame offset, fully determines the frame offset.

As part of the frame offset determination, an unambiguous determination of frame numbers may be performed. Various novel techniques for unambiguously determining the frame numbering associated with aligned channels and channels to be set up are also disclosed herein. These techniques facilitate the unambiguous determinations of CFN for multiple channels using simple counters.

Figure 1:
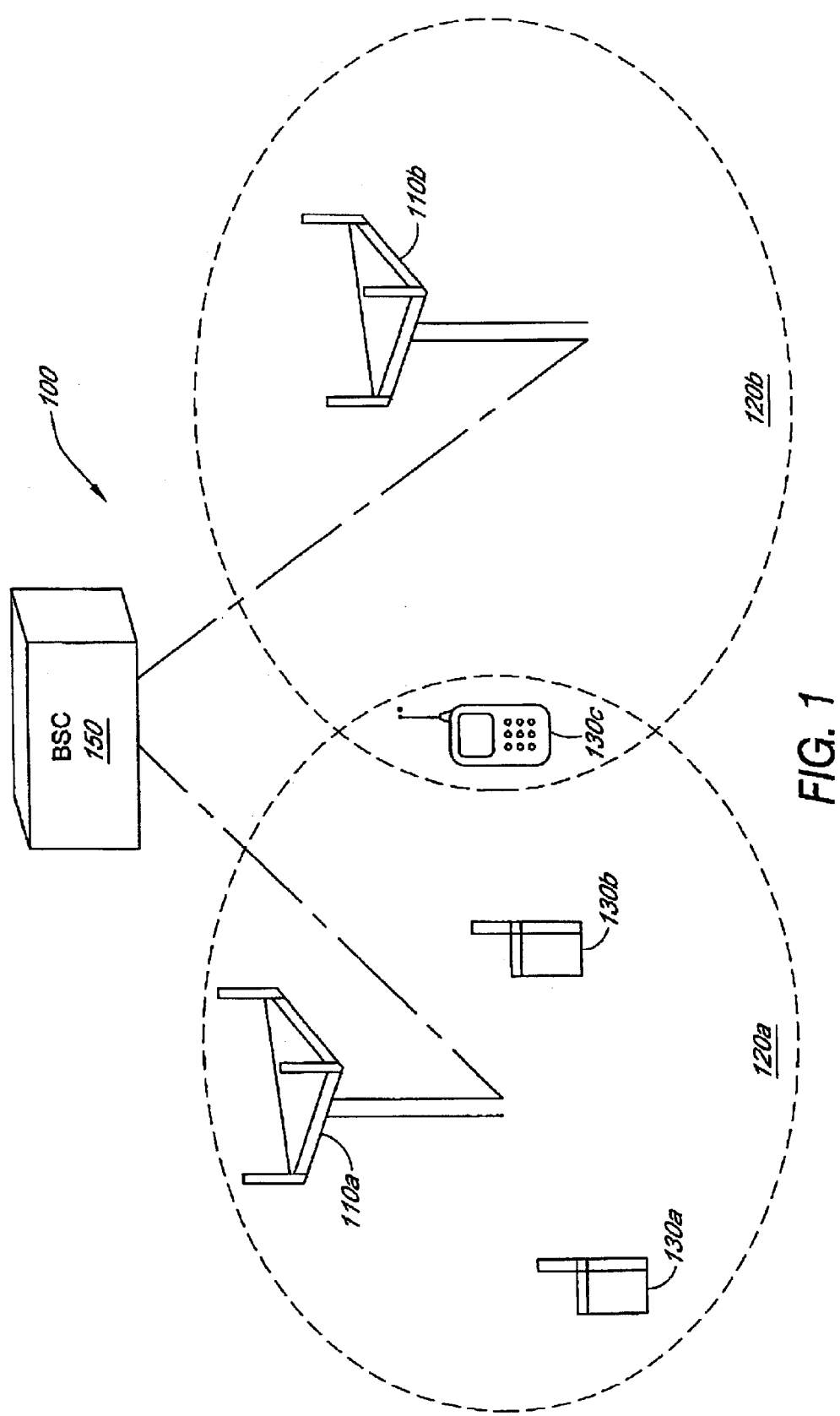
FIG. 1 is a functional block diagram of an embodiment showing a user equipment communicating with multiple base transceiver stations.

FIG. 1 shows a communication system 100 configured as a wireless communication system. The wireless communication system may be a UMTS wireless phone system, such as a UMTS Terrestrial Radio Access Network (UTRAN). The communication system 100 has one or more base stations, 110a and 110b, here shown as antenna systems typical of a wireless phone system. Although only two base stations 110a, 110b are shown, it is understood that the communication system 100 may support any number of base stations. Each base station 110a, 110b provides coverage for a corresponding cell 120a, 120b. The coverage areas or cells 120a, 120b supported by the two base stations 110a, 110b are shown to be overlapping. However, it is understood that where more than one base station is supported in the communication system 100, the cells supported by each base station may or may not overlap. Additionally, the cells of any three or more base stations may have some common coverage areas or may be mutually exclusive.

Because the operation of the communication system 100 within each cell is substantially identical, the discussion will focus on the operation within a single cell. A base station 110a supports coverage over a corresponding cell 120a. There may be one or more Mobile Stations (MS) 130a, 130b, within the cell 120a simultaneously communicating with the base station 110a. The MS 130a, 130b are shown as portable phones but it is understood that the MS 130a, 130b may be portable phones, mobile phones operating within vehicles, fixed position phones, wireless local loop phones, or any other communication device. The base station 110a communicates to each MS 130a, 130b, over a down link and each MS 130a, 130b communicates to the base station 110a over an up link. The base station 110a also communicates with a Base Station Controller (BSC) 150 that provides the communication link to a Public Switched Telephone Network (PSTN) not shown.

A MS 130c in a shared coverage area may be in communication with two BS 110a and 110b in the case of a soft hand over. The MS 130c may be travelling away from the coverage area 120a supported by the first BS 110a and into the coverage area 120b supported by the second BS 110b. The communication system 100 and the MS 130c need to hand off the communication from the first BS 110a to the second BS 110b in order for the MS 130c to maintain a communication link. The MS 130c needs to be able to synchronize its communication with the second BS 110b in order to soft combine the signals and eventually hand off.

In a UMTS system such as a Frequency Division Duplex (FDD) Wideband CDMA (W-CDMA) system, the down link and up link are defined as a collection of logical channels mapped to a set of physical channels. For example, a Downlink Dedicated Physical Channel (DDPCH) is configured as a sequential number of frames of information. Each frame is 10 mS in duration and is divided into sixteen slots. Each slot in the DDPCH carries information corresponding to a Dedicated Physical Control Channel (DPCCH) and a Dedicated Physical Data Channel (DPDCH). Another channel known as the Common Control Physical Channel (CCPCH) is configured as a Primary CCPCH (PCCPCH), one or more Secondary CCPCH (S-CCPCH) and a Physical Random Access Channel (PRACH).

The logical channels that are mapped to dedicated channels include a Broadcast Control Channel (BCCH) that is used to broadcast system control information such as the spreading code used within a cell. A logical channel that is mapped to a common channel includes the Broadcast Channel (BCH), which carries system and cell specific information. Such cell specific information may include available codes within the cell.

Mobile equipment, such as user equipment or a user device, searches the common channels of available base stations in order to set up communications with a particular base station. A mobile device initially uses the primary synchronization code of a Sync Channel (SCH) in order to acquire slot synchronization to a cell. Then the mobile device uses a secondary synchronization code from the SCH to find frame synchronization and to identify the code group of the cell. Then, the mobile device extracts the primary scrambling code used by the cell from the Common Pilot Channel (CPICH). After extracting the primary scrambling code, the mobile device detects the Primary Common Control Physical Channel (P-CCPCH). Additionally, the Broadcast Channel information can be read by the mobile device.

The mobile device uses the information on the Broadcast Channel (BCH) to set up a Downlink Dedicated Physical Channel (DL DPCH) so that it may communicate over a logical Dedicated Channel (DCH), which carries data and control information related to hand offs intended for the specific mobile device.

During a call, a mobile device monitors the signals from other cells. Information relating to the monitoring is related back to the UTRAN in order to assist in a soft hand off. For example, a mobile device performs a cell search for neighboring cells. The mobile device estimates the timing offset between a dedicated downlink channel used in the current communication and a Common Control Physical Channel (CCPCH) of the neighboring cell.

The mobile device may communicate the value of the timing offset to the UTRAN, for example to the neighboring base station. The UTRAN then adjusts the timing of the downlink dedicated channel of neighboring base station to minimize the offset of frames transmitted by the neighboring base station. Radio interface synchronization is the term used to refer to the timing of the radio frame transmission.

For example, the neighboring base station may adjust the Dedicated Physical Channel (DPCH) frames so that frames transmitted by both the original base station and the neighboring base station arrive nearly simultaneously at the mobile device. The near simultaneous reception of frames from the two base stations allows the mobile device to perform soft combining during soft hand off without the need for an extremely large buffer to compensate for the time offset between the two signals.

However, the neighboring base station typically adjusts its frame timing in steps of 256 chips in order to preserve downlink transmit orthogonality of the base stations. Furthermore the DPCH frames may be offset relative to the P-CCPCH frames from the same cell. The DPCH frame offset may be anywhere from zero to 38144 chips, typically in steps of 256 chips. Thus the frame offset, measured in increments of 256 chips, may vary from zero to 149. Additionally, there may be differences in multipath or propagation paths between the two base stations to the mobile device. These differences in the propagation from base station to mobile device contribute to the inability of frames transmitted by two base stations to simultaneously arrive at the mobile device. Thus, even when two base stations align their transmissions during a soft hand over, there may still be a time offset between the frames transmitted by the two base stations.

The UMTS specifications, such as 3GPP TS 25.402 titled "SYNCHRONISATION IN UTRAN STAGE 2", describe various parameters that are to be determined and which may be reported to the UTRAN in order to achieve and maintain synchronization between base stations. One such parameter determined by the mobile device is "OFF". Another parameter that is determined by the mobile device is "Tm".

OFF is a parameter that represents the integral frame offset between a frame of a Dedicated Physical Channel (DPCH) from the current base station and the corresponding frame of the P-CCPCH from a neighboring base station. The OFF parameter has a resolution of one frame and has a range of zero to 255 frames. OFF may be determined by selecting a time instant for which a frame number, N, from a neighboring base station begins. A second time instant represents the next frame border of DL DPCH from the current base station. The difference between the frame numbers at the two time instances modulo 256 frames equals OFF.

Tm is a parameter that represents the sub-frame offset remaining when the integral frame offset (or OFF) is subtracted from the total offset between a frame of a Dedicated Physical Channel (DPCH) from the current base station and the corresponding frame of the P-CCPCH from a neighboring base station. The Tm parameter has a resolution of one chip and a range of from zero to 38399 chips. That is, Tm is able to express any chip offset up to a full frame. The Tm parameter may be used to indicate the frame misalignment in chips, modulo one frame of chips, between the same channels from two different base stations. The Tm parameter, for example, may be used to represent a portion of the time difference between the Primary Common Control Physical Channel (P-CCPCH) from two base stations. Tm may be assumed to be zero for a first P-CCPCH used as a reference channel. Tm may then be determined to be the time difference between the P-CCPCH of a second base station and the reference channel. Tm may be determined using the same two time instances used for the determination of OFF. A first time instant occurs where a frame number, N, from a neighboring base station starts. A second time instant occurs at the next frame border of DL DPCH from a current base station. The time from the first time instant to the second time instant, in terms of chips, represents Tm.

Thus, in one embodiment of the invention, the mobile device communicating with a first base station constantly searches the signals from neighboring base stations in order to monitor the signal quality of the base stations. The mobile device may monitor the received power from the neighboring base stations and compare them to a predetermined threshold. The mobile device may more closely monitor and report parameters associated with the base stations for which the received power exceeds the predetermined threshold. The mobile device may report timing parameters such as OFF and Tm back to the UTRAN in order to assist in the hand off from the first base station to a neighboring base station.

The OFF and Tm values are used by the UTRAN during a soft hand over to schedule the frames on the neighboring DPCH. The frames are scheduled to arrive temporally coincident at the mobile device. However, multipath, obstructions, and other slow and fast fading contributors may cause the signals from neighboring base stations to rapidly change the signal power received at the mobile device. The rapid change in received signal power may cause the signal power from a neighboring base station to exceed and then fall below the monitoring threshold.

The computation of the timing parameters OFF and Tm is typically initially determined when a new cell power exceeds the threshold. However, the initial determination of the timing parameters is time and resource intensive. In certain urban environments the pilot channel densities may be high, thereby creating multiple base stations for which the timing parameters need to be determined. Recalculating the timing parameters for base stations that rapidly fall below and exceed the threshold consumes more processing resources than does monitoring the timing parameters for a base station continuously exceeding the threshold. Thus, the mobile device is configured to reduce the processing requirements for determining and monitoring the OFF and Tm parameters needed for a soft hand off.

Figure 2:
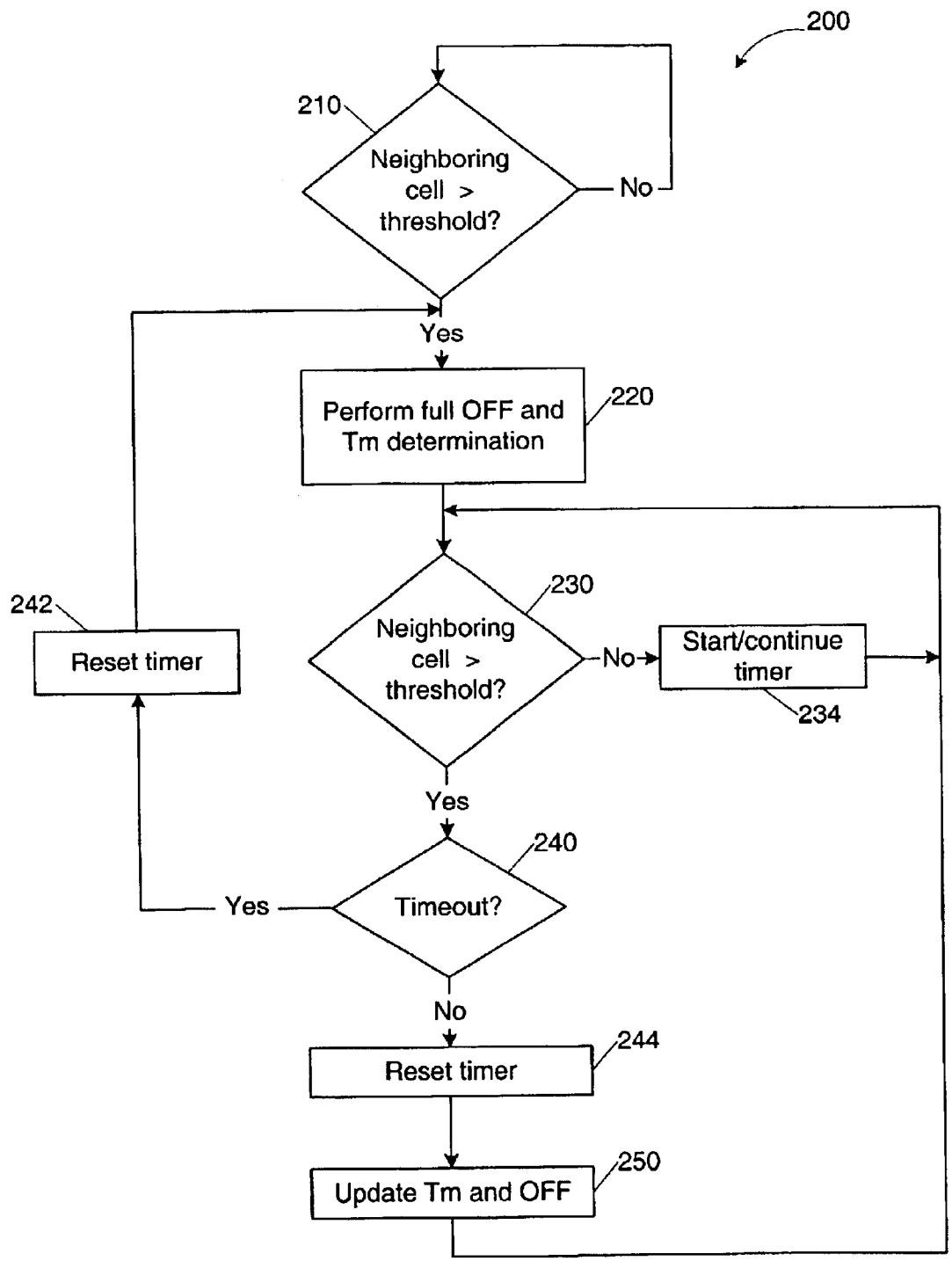
FIG. 2 is a flowchart showing an embodiment for determining and updating frame offsets in UMTS user equipment for neighboring cell transmissions.

FIG. 2 shows a flowchart of an embodiment of a process 200 of determining OFF and Tm parameters. The user equipment executes process 200 to determine the OFF and Tm parameters when a signal from a neighboring base station initially exceeds a predetermined threshold. Then, the Tm parameters are periodically redetermined and the OFF parameter updated based on the value of the redetermined Tm parameter. Although FIG. 2 is described with respect to the determination of the parameters for a single neighboring base station, the processes shown in FIG. 2 and the accompanying figures, and the apparatus performing these processes may perform some or all of the methods for applicable neighboring base station signals. The processes may be performed serially, in parallel, or a combination of serial and parallel operation for the various base station signals. Additionally, where a base station provides sectorized coverage, the processes may be applied to signals from each of the applicable sectors.

The user equipment initiates the method 200 by monitoring the received power of signals from neighboring base stations. At block 210, the user equipment, in which the method 200 is running, determines the received power of a signal transmitted by a neighboring base station. The user equipment may determine the power of the received signal for example, by determining a received signal strength indication. If the signal from a neighboring cell is greater than a predetermined threshold, the method 200 proceeds to block 220. However, if there are no neighboring base station transmissions that exceed the predetermined threshold, the method 200 loops back to block 210 where additional received signals are examined to see if they exceed the predetermined threshold. Thus, user equipment performing the method 200 may be configured to sequentially or simultaneously monitor multiple neighboring base station transmissions and determine the frame offset OFF and Tm parameters for all, or a subset of all, the neighboring base stations for which the received signal strength exceeds a predetermined threshold.

At block 220, the user equipment executing the method 200 performs full frame offset determination for the neighboring cell whose received signal exceeds the predetermined threshold. The user equipment then determines the OFF and Tm parameters. The determination of these parameters will be discussed in more detail in conjunction with the discussion of FIG. 3. Once the OFF and Tm parameters have been determined, the user equipment may report these values to a base station, for example, in a measurement report.

The user equipment may periodically update the frame offset parameters because a number of factors may contribute to a change in the offset parameters. These factors include, but are not limited to, changes in the position of the user equipment, changes in multipaths, or changes in path loss. The user equipment may more accurately assist in a soft hand over by accurately measuring and reporting the frame offset parameters.

The user equipment proceeds from block 220 to block 230 of the method 200 according to a predetermined update schedule. The predetermined update schedule may correspond to a predetermined period of time. In block 230, the user equipment performing the method 200 next determines if the received signal from the neighboring cell still exceeds the predetermined threshold. If the received signal from the neighboring cell no longer exceeds the predetermined threshold, the method proceeds to block 234 where the user equipment is instructed to start, or continue to increment, a timer. If the timer has not previously been started, block 234 instructs the user equipment to start the timer. However, if the user equipment has previously started the timer and the timer is currently running, block 234 instructs the user equipment to allow the timer to continue to increment.

The time accumulated on the timer is used by the user equipment executing the method 200 as a measure of the relative accuracy of the previous frame offset parameter measurements. Because the frame offset parameters do not typically vary suddenly, or in large increments, a previous measure of the offset values may be assumed to be relatively accurate, provided a short time has elapsed since the determination of the parameters. The previous determination of the frame offset parameters can be assumed to become more inaccurate as more time elapses since the parameter determination. Thus, there may be a point of elapsed time for which previously determined frame offset parameters may no longer be reliable. Prior to this elapsed time previously determined frame offset parameters may be assumed to be reliable and may be used as the basis for future updates of those parameters.

After initializing the timer in block 234, the user equipment executing the method 200 returns to block 230 where the received power from the neighboring cell is again compared against the predetermined threshold. After initializing the timer in block 234 the user equipment does not update the OFF and Tm frame offset parameters because the received power from the neighboring cell was less than the predetermined threshold.

Returning to block 230, if the received power from the neighboring cell is greater than the predetermined threshold, the user equipment proceeds to block 240 of the method 200. In block 240, the user equipment is directed to examine the value of the timer to see if a timeout has occurred. That is, the user equipment determines if the value on the timer exceeds a predetermined timeout value. If a timeout has occurred, the previously determined frame offset parameters are assumed to be unreliable. The user equipment executing the method 200 proceeds to block 242 where the timer is stopped and reset. The method 200 then loops back to block 220 where the user equipment performs a full determination of the frame offset parameters.

Returning to block 240, if a timeout has not occurred the user equipment proceeds to block 244 where the timer is stopped and reset. The frame offset parameters will be updated before the previously determined values are assumed to have become unreliable. Thus, the updated frame offset parameters can be assumed to be accurate at the time of the update. After the user equipment resets the timer in block 244, the method proceeds to block 250 where the user equipment updates the frame offset parameters.

Figure 3:
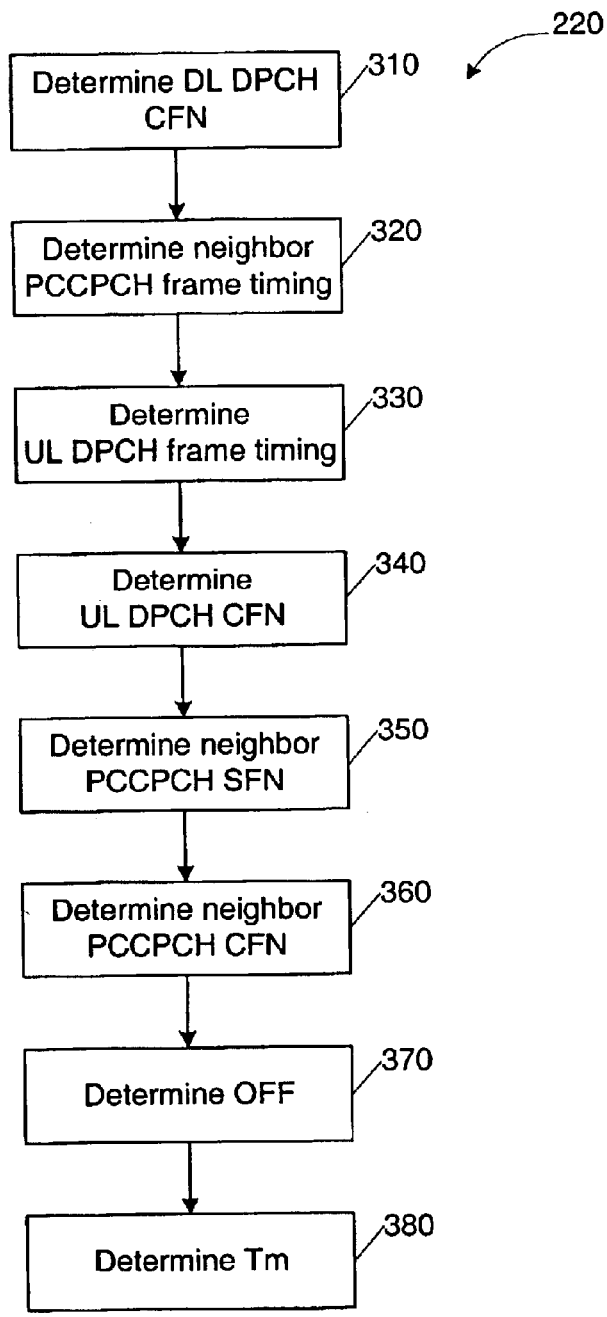
FIG. 3 is a flowchart showing an embodiment for determining a frame offset in UMTS user equipment.

In block 250, the Tm parameter is updated using portions of the method detailed in FIG. 3 and the OFF parameter is updated based on the value of the Tm parameter. Because the Tm parameter represents a sub-frame offset in increments of chips, the OFF value may be updated by determining a change in the Tm parameter. If the updated Tm parameter may be used to indicate a frame boundary has been crossed, thus indicating that the OFF parameter should be updated. A difference in Tm values is compared against a predetermined threshold. If an updated Tm value is different from a previously determined Tm value by some predetermined amount, a frame crossover has occurred. In one example, if the updated Tm value is greater than the previous Tm value, the OFF parameter is decreased by one. Alternatively, if the updated Tm parameter is less than or equal to the previous Tm parameter, the OFF parameter is increased by one. In this manner, the OFF parameter may be updated with less processing load. Following the update of the Tm and OFF parameters, the method 200 returns to block 230 and the user equipment again compares the received signal power against the predetermined threshold.

A detailed flowchart of an embodiment of a method 220 for initially determining the OFF and Tm parameters is shown in FIG. 3. The order of the operations performed in the method shown in FIG. 3 is an example of one embodiment. The method may be performed using a different order in other embodiments. The particular order shown in FIG. 3 is not a critical feature of the method.

The user equipment executing the method 220 initially determines the downlink (DL) DPCH connection frame number (CFN) in block 310. The CFN that is to be determined corresponds to a CFN of the serving DPCH, that is, the DPCH from the base station that the user equipment is currently associated. The user equipment initially acquires a communication channel by detecting the PCCPCH. The P-CCPCH carries System Frame Number (SFN) information that may be extracted by the user equipment. The user equipment may then establish a Connection Frame Number (CFN) based on the SFN in order to track the frames received from the particular base station. The. CFN as used herein represents a parameter used locally within the user equipment to track received frames and does not represent a system wide parameter.

The SFN broadcast in the P-CCPCH has a range of 0–4095 and increments with each received frame. The CFN generated within the user equipment is typically related to the SFN. The CFN has a range of 0–255 and increments with each received frame. Because the PCCPCH is used by the user equipment as a timing reference, the user equipment can determine a PCCPCH CFN corresponding to the SFN using the simple formula: P-CCPCH CFN=SFN mod 256, where 'mod 256' indicates the calculation is performed modulo 256.

The DL DPCH may be offset from the P-CCPCH and the offset is typically in increments of 256 chips. There may be many methods of determining an unambiguous CFN for the DL DPCCH. One embodiment of a CFN determination method is discussed below in conjunction with FIG. 5.

Once the user equipment executing the method 220 has determined the CFN for the DL DPCH associated with the PCCPCH, the user equipment proceeds to block 320 where the frame timing of the neighboring PCCPCH is determined. The frame timing for the neighboring PCCPCH may be determined using a chip level counter that resets to zero at each PCCPCH frame boundary. At a particular instant, the counter value is determined and compared against similar counters used to track other channels. Then, the timing of the PCCPCH relative to the other tracked channels may be determined.

Although a chip counter may be used that exactly counts exactly the number of chips in a frame, the counter may have other configurations. For example, the counter may operate at a multiple of the chip rate, and may count to a different multiple number of frames prior to resetting. The multiple of the chip rate is typically an integer as is the multiple of the number of frames. However, as noted earlier, the chip rate multiplier may not be the same as the frame number multiplier. Thus, a chip level counter that counts 38400 mn times in a single frame may be used, where m and n typically represent integers that may or may not be the same number. A non-integer factor may be used for m or n, however, this creates a greater burden on the processor because a fractional count at the end of each frame or a fractional chip offset at each count may need to be determined.

Another chip level counter that may be configured similar to the PCCPCH chip level counter can be used to determine the frame timing of the DL DPCH or the UL DPCH. The UL DPCH frame timing is determined in block 330. It may be preferable to track the UL DPCH instead of the DL DPCH frame timing. The UL DPCH generated within the user equipment may be used as a time reference and the timing of neighboring channels may be referenced to the UL DPCH. In this manner, when the user equipment hands off from one DL DPCH to another, the timing of the neighboring channels do not all need to be redetermined. The timing of the UL DPCH varies slowly, whereas the DL DPCH timing may take an incremental jump during a hand off. Thus, use of the UL DPCH as a fundamental timing reference for hand off eliminates discontinuous timing jumps that may occur during hand off. It is to be noted since OFF and Tm are parameters that are referred to the downlink, the actual timing reference used is really that of a "fictitious" downlink channel, called the Nominal Downlink Dedicated Physical Channel (ND DPCH), whose frame timing is defined to be always a constant 1024 chips ahead of the UL DPCH frames. This constant (1024 chips) is defined as $T_0$. From the previous example, if the frame timing of the UL DPCH is given by the UL DPCH chip-level counter as a count of $N_{UL-DPCH}$, the extrapolated chip-level count corresponding to the frame timing of the ND DPCH will be $N_{UL-DPCH}$ plus $T_0$ (mod 38400).

In addition to the frame timing information, the user equipment determines frame number information. As previously indicated, in block 310, the user equipment determines the unambiguous CFN of the DL DPCH. The UL DPCH CFN is determined on block 340. The UL DPCH frame timing is related to the DL DPCH frame timing for the serving cell. After initial setup of a DL DPCH, the UL DPCH frame boundary is determined to occur a constant time $T_0$ after the arrival of the DL DPCH frame. Thus, the UL DPCH CFN can be initially determined based on the previously determined DL DPCH CFN. A frame level counter may be used to track the UL DPCH CFN once the initial frame timing has been determined. Although the CFN counter operates modulo 256, a counter having eight or more bits is not required for the UL DPCH CFN counter. A counter having less than eight bits may be used to track the UL DPCH CFN, yet an unambiguous CFN may be determined. This method is detailed in FIG. 4 with a corresponding description provided below.

The user equipment executing the method 220, in block 350, determines the SFN of the neighbor PCCPCH. The SFN is broadcast on the P-CCPCH and the SFN may be determined directly by decoding the received neighboring P-CCPCH.

The method 220 then proceeds to block 360 where the user equipment determines the CFN of the ND DPCH at the next frame boundary of the neighboring P-CCPCH. Recall that the CFN is a parameter used locally within the user equipment to track received frames. The CFN for frames from the serving cell and neighboring cells will be the same at a single instant in time if the channels are temporally aligned. Typically, there is a time offset between the arriving frames, such that the CFN for frames from the serving cell are not identical to the CFN for frames from a neighboring cell that arrive at the same time.

In one example, if the extrapolated count from the ND DPCH is less than that from the chip-level UL DPCH counter, then a frame roll-over has occurred on the ND DPCH but not yet on the UL DPCH. In this case, the CFN of the ND DPCH extrapolated from that of the UL DPCH is one greater than the latter. Otherwise, the two CFNs are the same. Furthermore, if the count from the neighboring P-CCPCH chip level counter is greater than or equal to the extrapolated chip-level count of the ND DPCH (mod 38400), then the CFN of the ND DPCH at the neighboring P-CCPCH next frame boundary is one greater than the extrapolated CFN of the ND DPCH. In this example, the P-CCPCH and ND DPCH chip level counters are normalized to count 38400 chips in a frame. However, the value of the chip level counters may be normalized to any number that represents one frame.

Alternatively, if the neighboring P-CCPCH chip level counter is less than extrapolated chip-level count of the ND DPCH (mod 38400), then the CFN of the ND DPCH at the neighboring P-CCPCH next frame bounadry is two greater than the extrapolated ND DPCH CFN. Once the CFN value is determined, a frame level counter may be initialized to count the neighboring P-CCPCH CFN, incrementing at each frame boundary. Alternatively, the value of a running counter that increments at each frame boundary may be correlated to the determined CFN.

The user equipment executing the method 220 then proceeds to block 370 where the OFF parameter is determined. This value represents the offset in frames between frames from the serving cell and frames from the neighboring cell. OFF is determined to be the SFN minus CFN of the neighboring P-CCPCH modulo 256.

The value of Tm is determined in block 380. Tm represents the fractional frame offset, in terms of chips, between frames from the serving cell and frames from the neighboring cell. The value of Tm may be determined as the neighboring P-CCPCH chip level counter minus the extrapolated chip-level count for the ND DPCH. The chip level counters are typically normalized to count 38400 times within a frame, although the values may be normalized to any number that provides a suitable level of accuracy. However, when the counters are normalized to 38400, the value for Tm is directly determined in terms of chips, and the calculation of Tm is performed modulo 38400.

Figure 4:
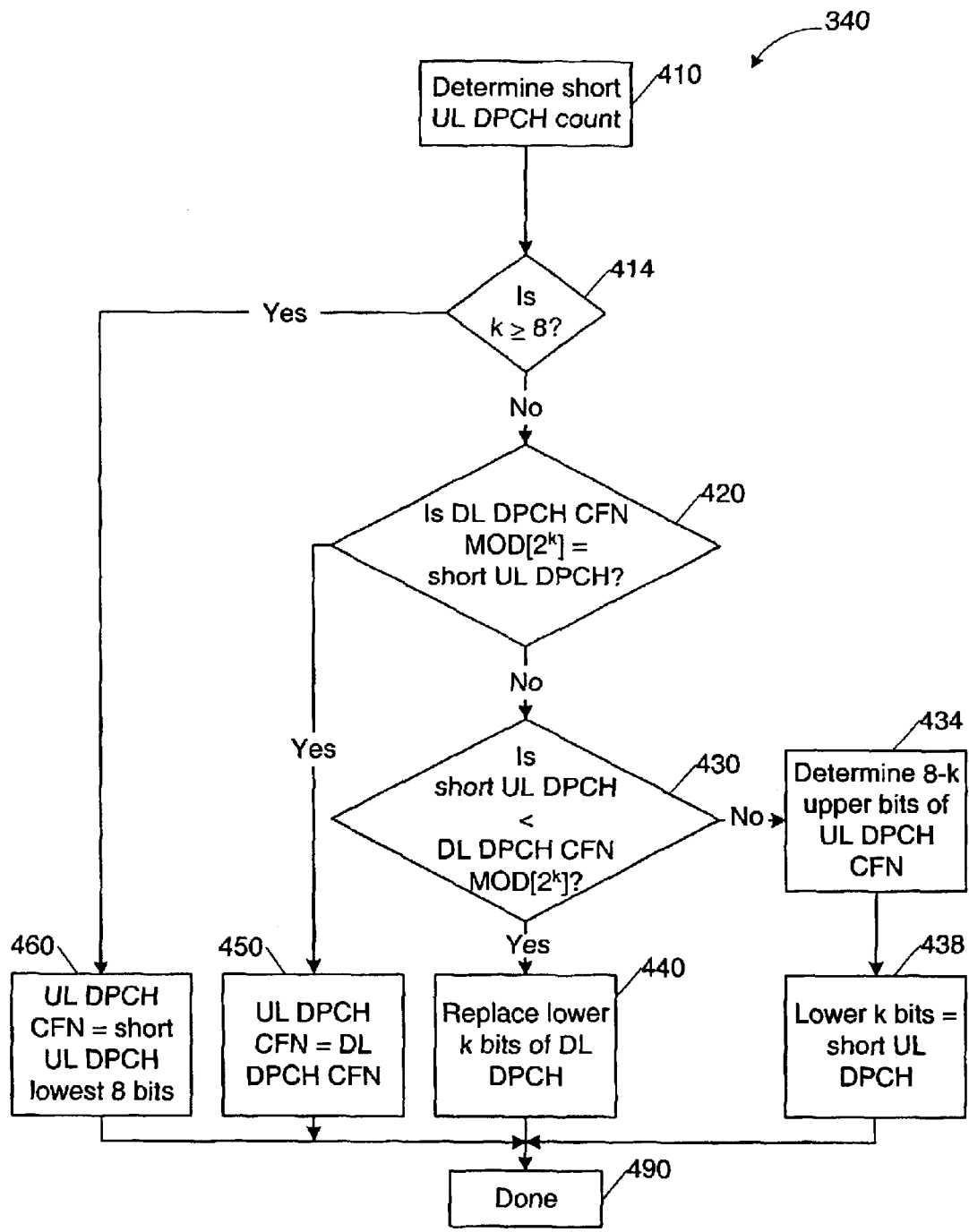
FIG. 4 is a flowchart of an embodiment of determining uplink DPCH connection frame numbers using a k-bit counter.

FIG. 4 shows a flow chart of an embodiment of a generalized method 340 of determining the UL DPCH CFN. Initially, the user equipment executing the method 340 begins in block 410 by determining a short UL DPCH count. This is performed by determining the value of the UL DPCH counter at substantially the same instant the DL DPCH counter value is determined. The value of the UL DPCH counter is referred to as the short UL DPCH count because typically, a counter having less than eight bits is used for the count. However, counters having eight bits or more may be used for the UL DPCH counter. The value of such a counter will still be referred to as a short UL DPCH count even when the UL DPCH counter uses eight or more bits.

The method 340 then proceeds to decision block 414 where the user equipment compares the number of bits in the UL DPCH counter is to a predetermined value. The number of bits in the UL DPCH counter may be defined to be 'k', where k may be any integer greater than, or equal to 1. Typically, k is chosen to be within the range of three to eight. In a particular embodiment, k may be chosen to be three, four, five, six, or seven. Thus, in the embodiment where k is equal to three, the UL DPCH counter is only able to count up to eight, from zero through seven, and thus the UL DPCH CFN typically cannot be determined directly from the short UL DPCH count.

If the number of bits, k, in the UL DPCH counter equals or exceeds eight, the CFN may be directly read from the counter. In embodiments where the UL DPCH counter is configured for eight bits or more, the method 340 proceeds to block 460 where the UL DPCH CFN is directly determined to be the lowest eight bits of the short UL DPCH count. Recall that the CFN count is a modulo 256 number. Therefore, an eight bit counter may directly represent a CFN value. Significant bits from counters that are greater than the eight least significant bits (LSB) do not provide any additional information relating to the CFN because the CFN value is modulo 256. Therefore, in this embodiment, only the eight LSBs are used to determine the CFN value when a counter having eight or more significant bits is used as the UL DPCH counter. Because the lowest eight significant bits of the counter precisely determine the UL DPCH CFN, the method 340 proceeds to block 490 to indicate it is done.

Returning to decision block 414, if the number of bits used in the UL DPCH counter is less than eight, the user equipment executing the method 340 proceeds to decision block 420 to compare the DL DPCH counter value to the short UL DPCH count. In decision block 420, the value of the DL DPCH CFN modulo $2^k$ is computed and compared to the value of the short UL DPCH count. Conceptually, this is equivalent to comparing the value represented by the lowest k significant bits of the DL DPCH CFN counter to the short UL DPCH. If the user equipment in decision block 420 determines that the two values are the same, the user equipment proceeds to block 450 where the UL DPCH CFN is determined to be the same as the DL DPCH CFN. Alternatively, if the lowest k bits of the DL DPCH counter are not the same as the k significant bits of the short UL DPCH, the method 340 proceeds to decision block 430.

The user equipment in decision block 430, compares the value represented by the lowest k bits of the DL DPCH counter against the short UL DPCH to determine if the short UL DPCH count is less than the value represented by the lowest k bits of the DL DPCH counter. If the value represented by the lowest k bits of the DL DPCH counter is not less than the short UL DPCH the user equipment performing the method 340 proceeds to block 440 where the UL DPCH CFN is determined. In block 440, the UL DPCH CFN is determined to be equal to the DL DPCH counter value with the lowest k significant bits replaced by the k significant bits of the short UL DPCH. The user equipment proceeds from block 440 to block 490 to indicate it is done.

Returning to decision block 430, if it is determined that the short UL DPCH count is greater than the value represented by the lowest k bits of the DL DPCH counter, the user equipment proceeds to block 434 where the value of the 8-k most significant bits of the UL DPCH CFN are determined to be equal to one less than the value represented by the 8-k most significant bits of the DL DPCH CFN in a modulo $[2^{(8-k)}]$ sense. This operation is typically performed modulo $[2^{(8-k)}]$ to correspond to the number of bits used in the counter. The user equipment proceeds to block 438 to determine the lowest k significant bits of the UL DPCH CFN. In block 438, the lowest k significant bits of the UL DPCH CFN are determined to be equal to the k bits of the short UL DPCH. From block 438, the user equipment performing the method 340 proceeds to block 490 to indicate it is done.

Figure 5:
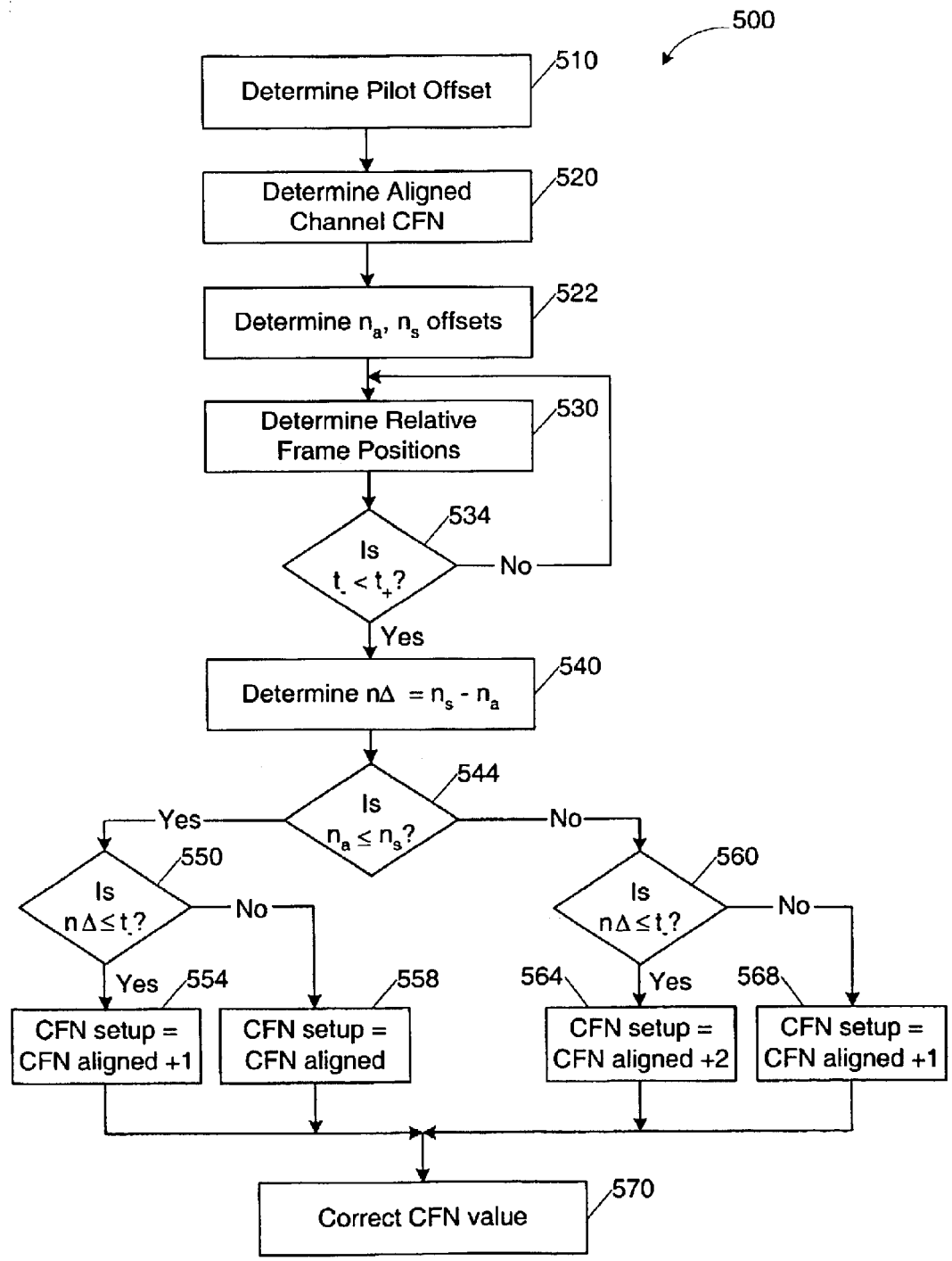
FIG. 5 is a flowchart of an embodiment of determining unambiguous connection frame numbers.

FIG. 5 shows a flowchart of an embodiment of a method of determining the unambiguous connection frame number (CFN) of the aligned channel anywhere within the designated configuration window of a setup channel. During initial setup of a DPCH or setup of a neighboring channel during a soft hand over, the frames being transmitted by the aligned channel may not coincide with the frames sent on the channel to be setup. The frames may be transmitted from a single base station, as in the case where the P-CCPCH is the aligned channel and the DPCH is the setup channel. Alternatively, the frames may be transmitted by different base stations, such as the case where the DPCH of a serving cell is the aligned channel and the P-CCPCH of a neighboring channel is the setup channel. Because the frames may not be aligned at the receiver, the CFN typically needs to be unambiguously determined in order to allow soft combining and reporting of the OFF and Tm parameters.

A physical channel setup typically occurs on a frame boundary. Additionally, there is a non-zero processing time that occurs in determining the setup parameters. To allow for the non-zero processing time, a setup window is defined as the period in which the setup parameters are determined. The end of the setup window occurs prior to the beginning of the next frame boundary to provide sufficient time for the non-zero processing. Additionally, the setup window begins slightly after the beginning frame boundary because of non-zero processing times and delays that may prevent actions directly at the frame boundary. The determination of unambiguous CFN typically occurs during a setup window to allow for processing to occur prior to the channel setup at the next frame boundary. Of course, setup may not occur on each frame boundary and the setup window may determine parameters that allow the channel to be setup on the next frame boundary or other frame boundaries in the occurring in the future.

The user equipment executing the method 500 begins at block 510 where a pilot offset is determined. The pilot offset determined is the difference between the pilot of the aligned channel and the pilot of the setup channel. The offset is zero if the aligned and setup channels are transmitted from the same base station.

The user equipment then proceeds to block 520 where the CFN of the aligned channel is determined. The CFN may be determined based on the information received from the aligned channel, as in the case of initial setup of the P-CCPCH, or may be determined using a frame level counter that tracks the CFN of the aligned channel.

The user equipment then proceeds to block 522 where the unsigned offset parameters na and ns are determined. The parameter na refers to a magnitude of a time offset of the aligned channel from a reference point. The parameter refers to the time offset of the setup channel from a reference point. The parameters may be received as messages or may be determined directly from the received frames. For example, if the setup channel is the DPCH of a serving cell, a time offset typically referred to as $\tau_{DPCH}$ is received by a mobile station in a setup message. Alternatively, an offset, such as ns may be determined based on the pilot offset determined in block 510. A sign associated with the offsets may indicate whether the offset is leading or lagging the reference channel. A positive sign indicates the channel is lagging the reference channel and a negative sign indicates the channel is leading the reference channel.

The user equipment performing the method 500 then proceeds to block 530 where relative frame position of the aligned channel is determined. The relative frame position may be determined using counters. A first counter may be a high resolution counter that typically is configured to provide at least chip level resolution. The high resolution counter may start from zero at each aligned channel frame boundary and count to some maximum number at the end of the aligned frame. For example, the high resolution counter may count at eight times the chip rate, start from zero at the aligned frame boundary, and count to 307,199 at the end of the aligned frame boundary before resetting to zero. Alternatively, the high resolution counter may count at a rate that is two times, three times, four times, tem times, sixteen times, or any other multiple times the chip rate.

A second counter may be a lower resolution counter that is used to track the CFN of the aligned channel. Once the CFN for the aligned channel is determined, the second counter may be initialized and configured to track the CFN. The second counter may be a lower resolution counter that is synchronized with the frame boundaries of the aligned channel and that increments with each frame of the aligned channel. As an example, the lower resolution counter may count from zero to 255 to directly track the CFN of the aligned channel.

In block 530, the relative frame position may be determined by the user equipment by observing the values of the first and second counters at two time instances designated t− and t+. At a first time instance, t−, the counters values are observed. At a second time instance, t+, the counters are again observed. The sample values for each time instance may be stored in memory. Preferably, the two time instances occur within the same setup window and there is sufficient time between t− and t+ such that the two samples of the high resolution counter are distinct and different in value.

The user equipment then proceeds to decision block 532 to determine if the value of the high resolution counter sampled at t− is less than the value of the high resolution counter sampled at t+. If the value of the high resolution counter at t− is greater than the value of the high resolution counter at t+ a frame boundary was crossed during the time between the two samples. Because the user equipment executing the method 500 is configured to operate using samples observed in a single setup window of a single frame, the user equipment returns to block 530 where the three counter values area gain observed.

Returning to decision block 534, if the value of the high resolution counter at t− is less than the value of the high resolution counter at t+, the user equipment determines the two samples were taken during the same frame of the aligned channel. This frame has the corresponding CFN represented by the lower resolution counter value. Typically, the value of the low resolution counter is sampled at t− or t+ but not both, although the value of the low resolution counter may be sampled at both t− and t+.

Once satisfactory counter samples have been observed, the user equipment proceeds to block 540 where a differential offset value is determined. As discussed earlier, it may be convenient to measure offsets of the aligned and setup channels to a common reference point. For example, the start of each frame from the P-CCPCH of the serving cell may be used as a time reference. The time offset of the aligned channel may then represent an offset for the start of a frame of the aligned channel relative to the start of the serving cell P-CCPCH frame. The offset of the aligned channel may be designated na. Similarly, the offset of the setup channel may be referenced to the same point. For example, the setup channel may be a P-CCPCH of a neighboring cell and the offset may be represented by the pilot offset determined in block 510. In block 540, the user equipment determines the value of the difference in offsets to be nΔ=ns−na.

The user equipment performing the method 500 then proceeds to decision block 544 where the values na and ns are compared. If na is less than or equal to ns, the user equipment proceeds to decision block 550. In decision block 550, the value of the difference in offsets, nΔ, is compared to the high resolution counter value sampled at t−. In order to perform the comparison, the values of nΔ and the counter value sampled at t− are typically adjusted to a common unit of measurement. For example, the counter value sampled at t− may be converted to an equivalent number of chip periods. Similarly, the value of nΔ may be converted to represent a number of chip periods. Alternatively, any common measurement unit may be used. If, in block 550, the user equipment determines that the value of nΔ is less than or equal to the value represented by the high resolution counter sampled at t−, the user equipment proceeds to block 554. In block 554 the CFN value of the setup channel at the next frame boundary is one greater than the CFN value of the aligned channel sampled in block 530.

Returning to decision block 550, if the user equipment determines that the value of nΔ is greater than the value represented by the high resolution counter sampled at t−, the user equipment proceeds to block 558. At block 558, the CFN value of the aligned channnle at the setup channel next frame boundary is determined to be equal to the CFN value of the aligned channel sampled in block 530.

Returning to decision block 544, if the value of na is not less than or equal to the value of ns the user equipment proceeds to decision block 560. In decision block 560 the value of nΔ is compared to the value of the high resolution counter sampled at t−. Again, the values of nΔ and the counter value at t− are normalized to a common unit of measurement. If nΔ is determined to be less than or equal to the counter value sampled at t−, the user equipment proceeds to block 564. In block 564 the CFN value of the aligned channel at the setup channel next frame boundary is determined to be two greater than the CFN value of the aligned channel sampled in block 530.

Returning to decision block 560, if the value of nΔ is determined to be greater than the value of the counter sampled at t−, the user equipment proceeds to block 568. In block 568, the CFN value of the aligned channel at the setup channel next frame boundary is determined to be one greater than the CFN value of the aligned channel sampled in block 530.

Following an initial determination of the setup channel CFN at blocks 554, 558, 564, or 568, the user equipment proceeds to block 570 to correct the CFN value for the sign associated with the offsets na and ns. If the signs of the two numbers are the same, whether both positive or both negative, the CFN number of the setup channel is not adjusted. However, if the sign associated with na is negative but the sign associated with ns is positive, the user equipment corrects the CFN by decrementing the previously determined CFN by one. Alternatively, if the sign associated with na is positive but the sign associated with ns is negative, the CFN is corrected by incrementing the previously determined CFN by one.

Thus, the CFN of the setup channel may be unambiguously determined using a counter to track the CFN of the aligned channel and a counter to track passage of time within a frame of the aligned channel. Two conditions of the CFN determination method 500 are typically encountered. The first is the setup of a DPCH of a serving cell after initially setting up the P-CCPCH. The second condition is the setup of a neighboring P-CCPCH for soft hand over when operating in a DPCH of a serving cell.

In the first example, the aligned channel is the P-CCPCH of the serving cell. Because the DPCH will be originating from the same base station, the pilot offset is zero. The CFN of the aligned channel may be determined directly from the P-CCPCH. The P-CCPCH information includes a SFN. The CFN associated with the P-CCPCH from the serving cell may be determined as the SFN modulo 256. A counter is initialized to count the CFN of the P-CCPCH. Similarly, a high resolution counter is initialized to count at eight times the chip rate. The high resolution counter resets to zero at each P-CCPCH frame boundary.

The P-CCPCH from the serving cell, in this example, is used as the time reference and also represents the aligned channel. Thus, the offset na is zero for this example. The offset of the DPCH being setup is represented by ns and may be determined by information transmitted by the base station. The value of ns is the $\tau_{DPCH}$ value transmitted by the serving base station. The sign associated with ns is positive because the DPCH lags the P-CCPCH.

Next, during a setup window, the values of the CFN counter and the high resolution counter are sampled at a time t− after a frame boundary of the P-CCPCH. At a time t+ after the same frame boundary, the high resolution counter is again sampled. The value of the P-CCPCH CFN at the next DPCH frame boundary is unambiguously determined based in part on the values of the offset, ns, the values of the high resolution counter at times t− and t+, and the value of the P-CCPCH CFN counter. This value is also defined as the CFN of the DPCH. Thus, once the unambiguous DPCH CFN is determined, the DPCH from the serving cell may be used as the aligned channel, while the P-CCPCH frame boundary could still be used as a reference point. The counters may be reset to align with the DPCH rather than the P-CCPCH.

In the second example, a neighboring P-CCPCH may be setup for a soft hand over. During setup of a neighboring P-CCPCH for a soft hand over, the DPCH from the serving cell may be used as the aligned channel and the P-CCPCH of the neighboring cell may be the setup channel. The P-CCPCH of the serving cell could still be used as the time reference as in the following example.

In this example, the pilot offset is for the serving and neighboring cells is determined to determine the magnitude of the offset of the setup channel as well as to determine its associated sign. The CFN of the aligned channel is determined directly from the lower resolution counter. The offset of the aligned channel, na, is determined directly as $\tau_{DPCH}$ while the offset of the setup channel, ns, is determined when the pilot offset is determined. The sign of the offset na is determined by the sign of the offset for $\tau_{DPCH}$ which is positive.

The unambiguous CFN of the DPCH at the next frame boundary of the neighboring P-CCPCH may then be determined by sampling the high and lower resolution counters of during a setup window of the DPCH and correcting for any sign associated with the two offset numbers, na and ns.

Figure 6:
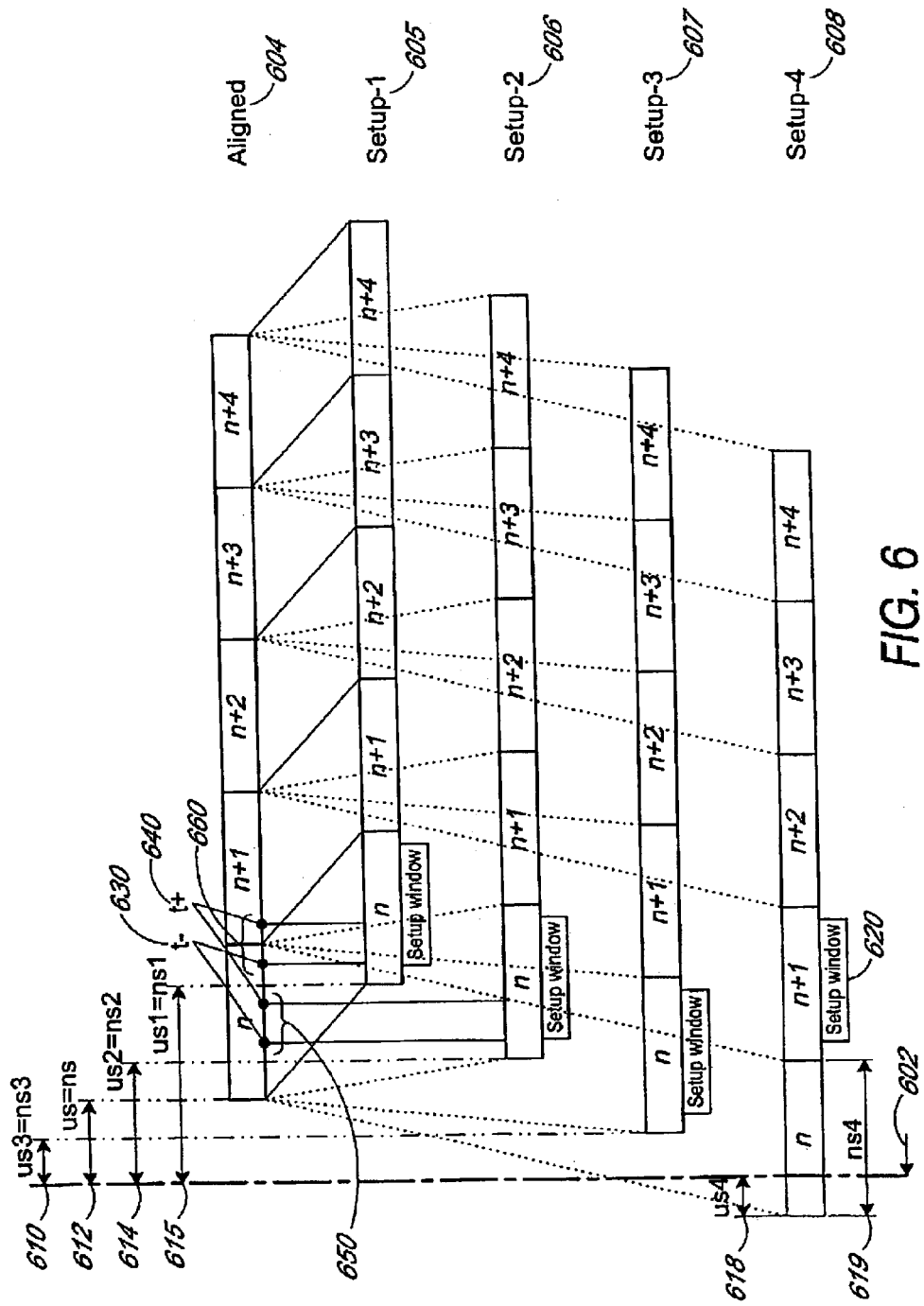
FIG. 6 is a timing diagram showing derivation of frame numbers for a variety of different offsets.

FIG. 6 is a time diagram showing derivation of frame numbers for a variety of different offsets. A mobile station may need to simultaneously track multiple neighboring channels for potential soft hand over and thus may need to determine the unambiguous CFN for the channels associated with each of the neighboring cells.

Shown are frames for an aligned channel 604 and four setup channels 650–608. Also shown is a reference line 602 that may represent, for example, a frame boundary of a P-CCPCH of the serving cell. Setup windows 620 are representatively shown in each of the four setup channels 605–608. Typically, a setup window 620 may occur in each frame, although only one setup window 620 is shown for each channel for purposes of clarity. The offset of the aligned channel 604 relative to the reference point 602 is designated ua and na 612. As discussed earlier, na represents the magnitude of the offset. Here, the term ua is used to represent the signed value of the offset. For the aligned channel 604 in this example, ua and na are the same because the aligned channel 604 lags the reference line 602. Similarly, the unsigned magnitudes of the offsets for the setup channels 605–608, are designated ns3 610, ns2 614, ns1 616, and ns4 619. Note that for setup channels 1 through 3 605–607, the unsigned offset equals the signed offset because the channels lag the reference line 602. However, the unsigned offset us4 618 for setup channel 4 608 is different from the unsigned magnitude of the offset 619 because the channel leads the reference line 602.

The timing diagram also shows two time instances, t− 630, where samples of the aligned channel counters may be observed and two time instances, t+ 640, where the samples of aligned channel counters may be taken. The first matched pair of t− and t+ 650 occurs within the same frame of the aligned channel. Thus, these samples may be used in the unambiguous determination of the setup channel CFN. However, note that the second pair of t− and t+ 660 straddles a frame boundary. For this pair the t− high resolution counter value would exceed the t+ high resolution counter value. Thus, a new set of samples would need to be observed before determining the CFN values according to the method of FIG. 5. Thus, it may be seen that with only a high resolution and lower resolution counters, the unambiguous CFN of a number of setup channels may be determined.

Figure 7:
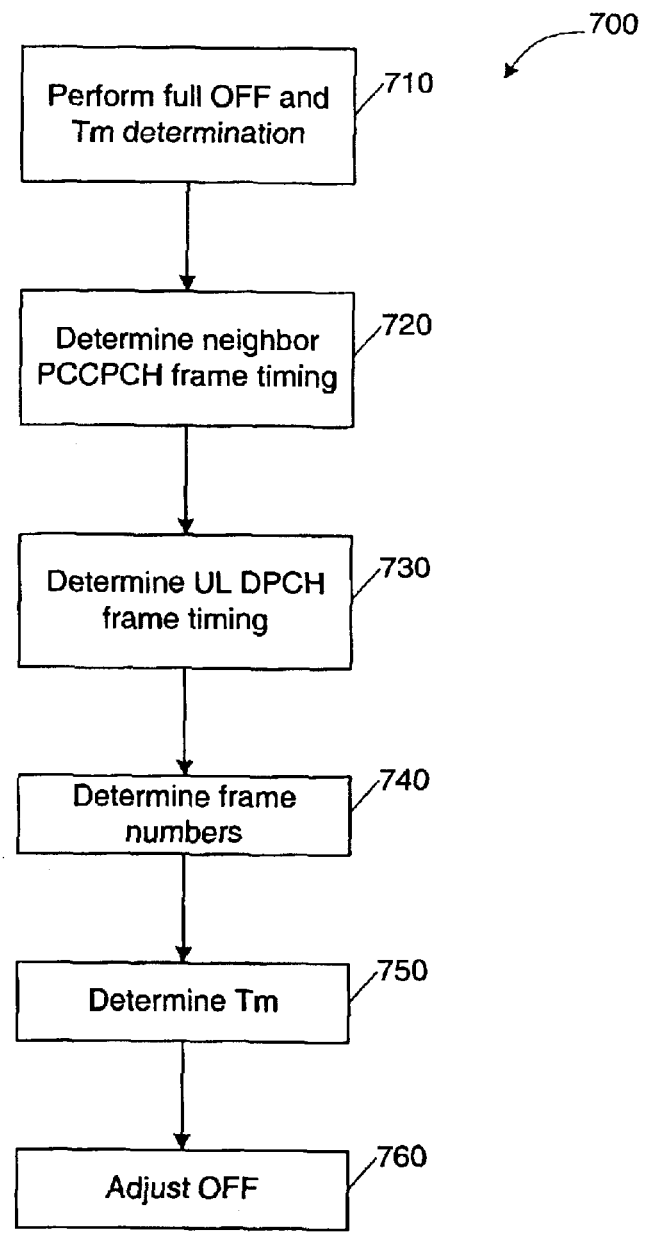
FIG. 7 is a flowchart showing an example of updating Tm and OFF parameters after initial determination.

FIG. 7 shows a flow chart of an embodiment of a method 700 of updating OFF and Tm parameters following an initial full determination for which the unambiguous CFN determination is a part. The user equipment executing the method 700 begins at block 710 where a complete frame timing determination is performed. For example, a full OFF and Tm determination according to the method shown in FIG. 3 may be performed when the power received from a monitored cell initially exceeds a predetermined threshold. After initially determining the OFF and Tm parameters, the values of the parameters are periodically updated. The update may be performed by redetermining the value of the Tm parameter and updating the OFF parameter based in part on the value of the Tm parameter. An example of the steps for updating of the OFF and Tm parameters is shown in blocks 720 through 760 of the method 700. The functions performed in each of these blocks may be repeated on a periodic basis to provide periodic update of the OFF and Tm parameters without the need to perform a complete determination of the two parameters.

Updating the OFF and Tm parameters begins at block 720 after an initial determination has been performed in block 710. Typically, some predetermined update period will have elapsed from the time of initial determination before parameter updating in block 720 commences. In block 720, the user equipment begins the update by determining the neighbor P-CCPCH frame timing. The user equipment, in block 720, may perform some or all of the functions previously described with respect to block 320 in FIG. 3. The frame timing for the neighboring P-CCPCH may be determined using a chip level counter that resets to zero at each P-CCPCH frame boundary. At a particular instant, the counter value is determined and compared against similar counters used to track other channels. Then, the timing of the P-CCPCH relative to the other tracked channels may be determined.

The user equipment proceeds to block 730 where the UL DPCH frame timing is determined. The UL DPCH frame timing is determined using a chip level counter, as was done during initial full determination of the OFF and Tm parameters. As discussed earlier, the counter typically has a resolution of at least one chip and counts an integer multiple of 38400 chips before restarting at zero.

At block 740 the user equipment determines the frame numbers for channels involved with a hand over using the frame level counters. Typically, the frame numbering for the DL DPCH, UL DPCH, and neighboring P-CCPCH are determined using frame level counters that are initialized during full OFF and Tm determination. The frame numbers may be determined by directly reading the values of the respective counters if the counters were previously initialized to count the frame number. Alternatively, the values of the respective counters may be correlated to the frame numbers using correlation information gathered during full timing determination. If the frame level counter used to track the UL DPCH frame number is not an eight bit counter, the value may be adjusted using the method detailed in FIG. 4.

Typically, the values of the chip level counters and the values of the frame level counters are read substantially simultaneously. The counter values are read substantially simultaneously if the counter values are read within the period of one chip. Alternatively, the counters maybe read substantially simultaneously if they are read within a single period of the highest rate counter, that is the counters are read during the shortest period defined by the counters. Alternatively, the counter values are read substantially simultaneously if the determination of the OFF and Tm timing parameters vary by less than a predetermined error value.

Once the chip level counter values and frame level counter values have been read such that the relative frame timing and frame numbers can be determined, the Tm value may be re-determined. The user equipment, in block 750, determines the value of the Tm parameter based in part on the counter values. The value of Tm may be determined as the neighboring P-CCPCH chip level counter minus the sum of the UL DPCH chip level counter and $T_0$. The chip level counters and $T_0$ are typically normalized to count 38400 times within a frame, although the values may be normalized to any number that provides a suitable level of accuracy. However, when the counters and $T_0$ are normalized to 38400, the value for Tm is directly determined in terms of chips and the calculation of Tm is performed modulo 38400. As before, $T_0$ represents a constant value of 1024 chips.

After determining the value of Tm in block 750, the user equipment proceeds to block 760 where the value of the OFF parameter is adjusted based at least in part on the value of the Tm parameter just determined. The most recently determined Tm value is compared against a previously determined Tm value. If the change in the value of the Tm value indicates a frame boundary has been crossed, the value of the OFF parameter is adjusted to reflect the change. A change in Tm values of greater than a predetermined threshold value may indicate a frame boundary has been crossed. The predetermined threshold value used in the frame boundary determination may be one half the number of chips in a frame, or 19200 chips. For example, the Tm parameter value may initially be determined to be slightly less than a full frame, such as 38380. The next update of the Tm parameter value may indicate that the Tm parameter value is only a fraction of a full frame, such as 5. The frame offset between a servicing cell and a neighboring base station typically changes slowly over time with respect to the update period of the Tm parameter. Because the determination of the Tm parameter is performed modulo 38400 in our example, the change in Tm value from 38380 to 5 indicates that a frame boundary was crossed. Thus the value of the OFF parameter is incremented to indicate this change.

In this manner, the value of the OFF and Tm parameters may be updated without having to periodically perform the full OFF and TM determination for each neighboring cell. The time and processing power required to update the frame timing parameters is greatly reduced by not having to decode the SFN from each neighboring P-CCPCH at each update.

Note that after a hand over, the OFF and Tm parameters do not need to be re-determined using a full OFF and Tm determination. The process of updating the two parameters is accurate after a hand over occurs.

The update process is performed for each neighboring cell for which the received power exceeds a predetermined threshold. When the received power from the neighboring cell momentarily falls below the threshold the update procedure is not performed. However, the counters are still maintained. An additional timer is initialized to track the time that the energy of the neighboring cell remains below the predetermined threshold. If the received energy from the neighboring cell remains below the threshold for some predetermined amount of time the frame offset parameters OFF and Tm must be re-determined using a full determination. However, if the energy from the neighboring cell exceeds the threshold before expiration of the predetermined time, the values of OFF and Tm may be updated using the update routine.

The following pseudo-code represents one example of the operation of the OFF and Tm fine tuning operation performed in the update routine.

```
#define MIN_DIFF = 19200 /* Half of a frame in chips on the
PN circle */
FineTuneOFFAndTm
{
    if (UTRANHasAskedForOffAndTm)
    {
        /* Avoid computing OFF if it was recently done from the cell */
        if (NoNeedToRecompute)
        {
            /* Get frame timing and Tm */
            ComputeOnlyTm ( ) ; /* Do not set up neighbor P-CCPCH
            */
            /* Check and adjust OFF if necessary */
            if (ChipsTmMovedBy > MIN_DIFF) /*
            Tm crossed a frame
            */
            {
                if (LatestTm > EarlierTm)
                {
                    /* Decrement OFF by 1 */
                }
                else
                {
                    /* Increment OFF by 1 */
                    OFF = OFF + 1;
                }
            }
        }
        else
        {
            /* Compute both OFF and Tm */
        }
    }
}
```

Figure 8:
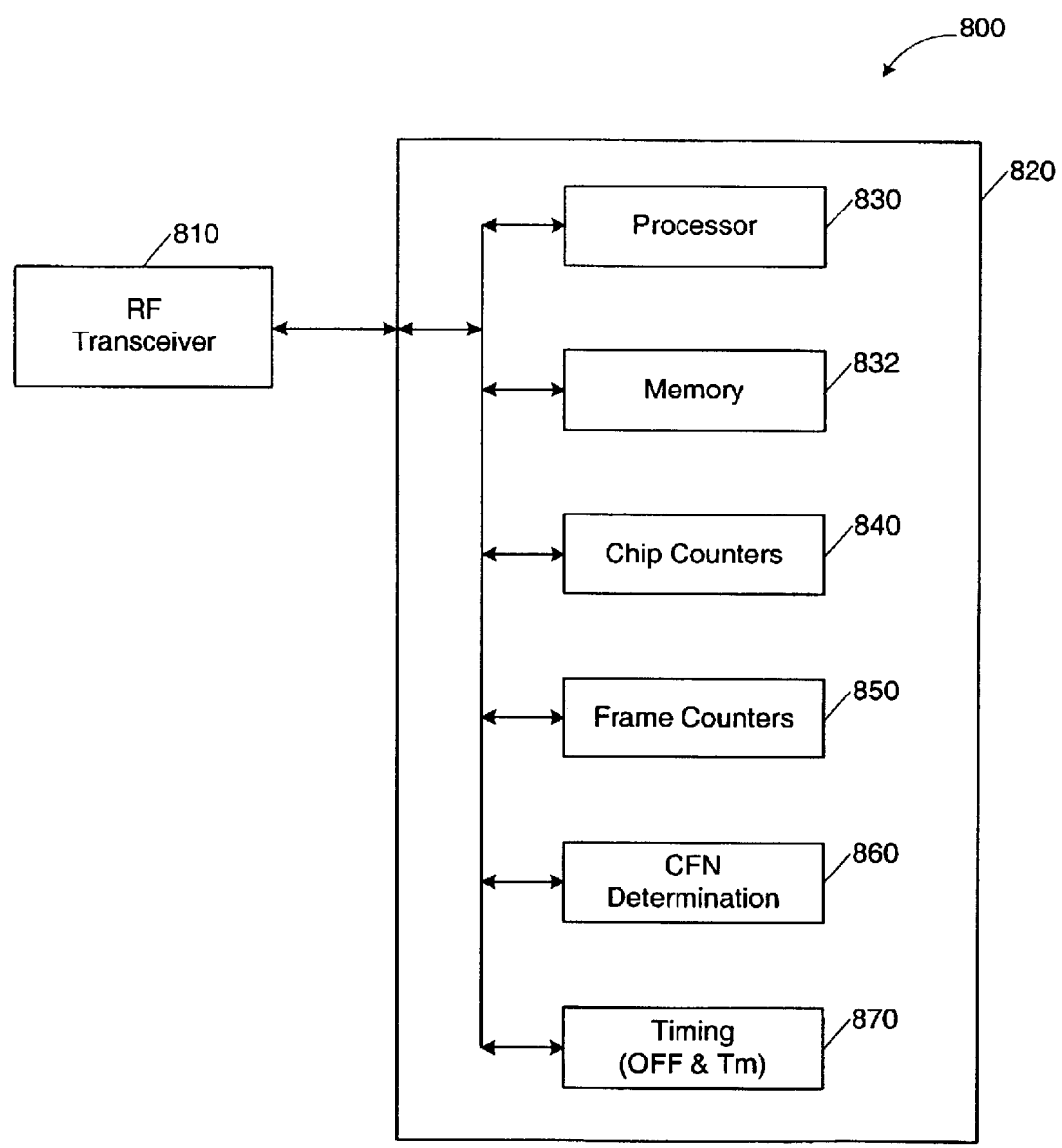
FIG. 8 is a functional block diagram of an embodiment showing a user equipment configured to determine the offset timing of frames relative to an aligned channel.

FIG. 8 is a functional block diagram of an embodiment showing a user equipment 800 configured to determine the offset timing of frames relative to an aligned channel. The user equipment 800 may, for example, be configured to determine OFF and Tm parameters as part of operation in a frequency multiplexed asynchronous communication system.

The user equipment 800 may, for example, be a WCMA wireless phone. The user equipment includes an RF transceiver 810 configured to perform the majority of frequency conversion and modulation operations. The user equipment 800 also includes a baseband processor 820 to perform baseband processing and user interface operations.

The RF transceiver 810 interfaces over a wireless link to the wireless communication system. Typically, the RF transceiver 810 interfaces with one or more base stations of the wireless communication system. The RF transceiver 810 includes a receiver configured to receive transmitted RF signals in one or more designated frequency bands. The received signals are typically filtered, amplified, downconverted, demodulated, and further processed in the RF transceiver before coupling the received signal to the baseband processor 820.

Similarly, baseband signals from the baseband processor 820 are coupled to the RF transceiver 810 for transmission to one or more base stations. The RF transceiver 810 may filter, amplify, modulate, upconvert and further process the baseband signal prior to transmitting to the base stations.

The baseband processor 820 is configured to perform many operations. The baseband processor 820 may perform the unambiguous determination of CFN and the determination of the offset parameters. Alternatively, the determination of the unambiguous CFN may be performed in one or more other modules and the determination of the offset parameters may also be performed in one or more other modules. However, in this embodiment, the functions are performed in the baseband processor 820.

The baseband processor 820 includes a processor 830 that may be configured to perform one or more functions relating to either unambiguous CFN determination as well as offset determination. The processor 830 may be connected to a memory 832 that may include one or more storage devices. The memory 832 may store computer readable instructions that direct the processor to perform one or more of the functions relating to unambiguous CFN determination or offset determination.

The baseband processor 840 may also include chip counters 840 used in the unambiguous CFN determination or offset determination methods. The chip counters 840 may be implemented as hardware counters or may be implemented in software. Additionally, the chip counters may be implemented as a combination of hardware and software. The chip counters 840 include the high resolution counters used in the unambiguous CFN determination. The chip counters 840 also include the chip level counters used in the offset determination.

The baseband processor 820 also includes frame counters 850. The frame counters 850 may be implemented in software, hardware, or a combination of software and hardware. The frame counters 850 include the frame level counter used to track the aligned channel CFN in the unambiguous CFN determination. The frame counters 850 also include the frame level counters used to track the DL DPCH or P-CCPCH frames and the frame level counter used to track the UL DPCH frames.

A CFN determination module 860 is also included in the baseband processor. The CFN determination module 860 may interface with the appropriate chip counters 850 and frame counters 860 as well as the processor 830 and memory 832 to obtain the unambiguous CFN of the various setup channels.

The baseband processor 820 also includes a timing module 870 that is used to determine the offset parameters. The offset parameters may include the OFF and Tm parameters used in a soft hand over to a neighboring base station. The timing module 870 communicates with the CFN determination module 860, the appropriate frame counters 850, the appropriate chip counters 850, the processor 830 and memory 840 to determine the offset parameters used in the soft hand over.

Various techniques for determining frame offsets, such as frame offset parameters used in a soft hand over, have been disclosed. These techniques facilitate one or more frames to be tracked simultaneously without a heavy time or processing burden. The method of determining frame offsets may also use a novel method and apparatus disclosed herein for unambiguously determining the frame numbers, such as CFN, of frames from one or more setup channels.

Further to the description of the soft hand off operation and OFF/Tm computation outlined above, an additional optimization embodied in this invention is as follows. Allocation of cell scrambling codes is planned by network planners very carefully so that even under the most severe multipath conditions, user equipment may never see the same scrambling code from two different cells at any given spot. The only manner in which a user equipment may see the same scrambling code from a different cell is if the user equipment has moved to the cell located in a different geographic location altogether. For a vast majority of dedicated channel activities, including for both voice-calls and data-calls, the duration of the activity may never be long enough for that to happen. Therefore, within a period of time during which the dedicated physical channel is continuously active, measurements of the OFF and Tm parameters for a given cell may be remembered for subsequent use during the call. For example, if OFF and Tm have been measured for a given cell scrambling code once during a period of continuous DPCH activity, the measured parameters will be saved and used without any further measurements when subsequent soft hand off calls for those parameters for the particular cell scrambling code. In an environment where the same cell comes drops in to and out of the user equipment's "view" over and over again during DPCH activity, this optimization may significantly reduce the delay in reporting OFF and Tm, since setting up a neighbor P-CCPCH and measuring OFF and Tm from scratch is time consuming. In one implementation, the OFF and Tm is stored for every cell even as it moves out of the active set and into the unlisted set, so that the next time the cell reappears in the neighbor set, OFF and Tm need not be re-measured.

Electrical connections, couplings, and connections have been described with respect to various devices or elements. The connections and couplings may be direct or indirect. A connection between a first and second device may be a direct connection or may be an indirect connection. An indirect connection may include interposed elements that may process the signals from the first device to the second device. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The techniques described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The above description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A method in a wireless device of determining a timing offset of a channel relative to a reference channel, the method comprising:
    determining an integer number of full frames offsetting the channel from the reference channel;
    determining a fractional number, less than one, of full frames offsetting the channel from the reference channel such that the timing offset may be determined from the sum of the integer number of full frames with the fractional number of full frames;
    re-determining the fractional number of full frames; and
    updating to a memory the integer number of full frames based, at least in part, on the fractional number of full frames.

2. The method of claim 1, wherein re-determining the fractional number and updating the integer number of full frames is performed periodically.

3. The method of claim 1, further comprising, prior to re-determining the fractional number frames and updating the integer number of full frames, comparing an energy of the channel to a predetermined threshold.

4. The method of claim 1, wherein determining the integer number of full frames offsetting the channel from the reference channel comprises:
    determining a frame number of the reference channel;
    determining frame timing of the channel;
    determining a frame number of the channel; and
    determining the difference of the frame number of the channel minus the frame number of the reference channel.

5. The method of claim 4, wherein determining the frame number of the reference channel comprises:
    determining an offset magnitude of the reference channel relative to a reference point;
    determining a frame position of the reference channel;
    determining the frame number based at least in part on the offset magnitude and the frame position.

6. The method of claim 1, wherein re-determining the fractional number of full frames comprises:
    sampling a first counter value that resets at a frame boundary of the channel;
    sampling a second counter value that resets at a frame boundary of the reference channel; and
    determining the fractional number of full frames based at least in part on the first and second counter values.

7. The method of claim 1, wherein the reference channel is a serving base station channel and the channel is a neighboring base station channel.

8. The method of claim 1, wherein the reference channel is an Up Link Dedicated Physical Channel (UL DPCH) of a wireless communication link and the channel is a Primary Common Control Physical Channel (P-CCPCH) from a neighboring base station.

9. A method of determining a timing offset of an uplink wireless communication channel to a neighboring base station channel, the method comprising:
    determining a frame number of the uplink wireless communication channel;
    determining frame timing of the neighboring base station channel;
    determining a frame number of the neighboring base station channel;
    determining a frame offset using the difference of the frame number of the neighboring base station channel minus the frame number of the uplink wireless communication channel;
    determining a fractional number of frames, less than one, offsetting the neighboring base station channel from the uplink wireless communication channel such that the timing offset may be determined, in part, from the sum of the frame offset with the fractional number of full frames;
    re-determining the fractional number of full frames; and
    updating the frame offset based, at least in part, on the fractional number of full frames.

10. A wireless communication device configured to determine a timing offset of first channel to a second channel, the wireless communication device comprising:
    an RF transceiver configured to communicate using the first and second channels; and
    a timing module connected to the RF transceiver, the timing module configured to determine a frame offset and a fractional frame offset of the first channel to the second channel, the timing module further configured to periodically re-determine the fractional frame offset and update the frame offset based at least in part on the re-determined fractional frame offset.

11. The wireless communication device of claim 10, further comprising:
    a frame counter connected to the timing module, the frame counter configured to count the frame number of the first channel and further configured to derive a frame number of the second channel; and
    wherein the timing module determines the frame offset based, at least in part, on the difference of the frame number of the first channel from the frame number of the second channel.

12. The wireless communication device of claim 11, wherein the timing module updates the frame offset if the re-determined fractional frame offset differs from a previously determined fractional frame offset by more than a predetermined amount.

13. A processor readable storage device having processor readable code embodied thereon, the processor readable code for programming one or more processors to perform a method of determining a timing offset of a channel relative to a reference channel, the method comprising:

determining an integer number of full frames offsetting the channel from the reference channel;

determining a fractional number, less than one, of a full frame duration offsetting the channel from the reference channel such that the timing offset may be determined from the sum of the integer number of full frames with the fractional number of the full frame duration;

redetermining the fractional number of the full frame duration; and updating the integer number of full frames based, at least in part, on the fractional number of the full frame duration.

14. A method of determining a frame number of a setup channel, the method comprising determining a frame number of the aligned channel;

determining an aligned frame offset relative to a reference point;

determining a setup channel offset relative to the reference point;

determining a relative frame position of the setup channel to the aligned channel;

determining the frame number of the setup channel based, at least in part, on the relative frame position, the aligned frame offset, and the setup channel offset.

15. The method of claim 14, further comprising:

determining a pilot offset of a pilot signal for an aligned channel relative to a pilot signal for the setup channel; and determining a corrected frame number of the setup channel based in part on the pilot offset.

16. The method of claim 14, wherein determining the relative frame position comprises sampling a counter that resets at each frame boundary of the aligned channel.

17. The method of claim 14, wherein determining the frame number of the setup channel comprises:

comparing the aligned frame offset to the setup channel offset;

determining a difference between the setup channel offset and the aligned frame offset;

comparing the difference to the relative frame position;

if the aligned channel offset is less than or equal to the setup frame offset and the difference between the setup channel offset and the aligned frame offset is less than the relative frame position, determining the frame number of the setup channel to be one greater than the frame number of the aligned channel.

18. The method of claim 14, further comprising, if the aligned channel offset is less than or equal to the setup frame offset and the difference between the setup channel offset and the aligned frame offset is greater than the relative frame position, determining the frame number of the setup channel to be equal to the frame number of the aligned channel.

19. The method of claim 14, further comprising, if the aligned channel offset is greater than the setup frame offset and the difference between the setup channel offset and the aligned frame offset is less than the relative frame position, determining the frame number of the setup channel to be two greater than the frame number of the aligned channel.

20. A wireless communication device for determining a timing offset of a channel relative to a reference channel, the device comprising:

means for determining an integer number of full frames offsetting the channel from the reference channel;

means for determining a fractional number, less than one, of full frames offsetting the channel from the reference channel such that the timing offset may be determined from the sum of the integer number of full frames with the fractional number of full frames;

means for re-determining the fractional number of full frames; and means for updating to a memory the integer number of full frames based, at least in part, on the fractional number of full frames.

21. A wireless communication device for determining a timing offset of an uplink wireless communication channel to a neighboring base station channel, the device comprising:

means for determining a frame number of the uplink wireless communication channel;

means for determining frame timing of the neighboring base station channel;

means for determining a frame number of the neighboring base station channel;

means for determining a frame offset using the difference of the frame number of the neighboring base station channel minus the frame number of the uplink wireless communication channel;

means for determining a fractional number of frames, less than one, offsetting the neighboring base station channel from the uplink wireless communication channel such that the timing offset may be determined, in part, from the sum of the frame offset with the fractional number of full frames;

means for re-determining the fractional number of full frames; and means for updating the frame offset based, at least in part, on the fractional number of full frames.

* * * * *

UNITED STATES PATENT AND TRADEMARK OFFICE
CERTIFICATE OF CORRECTION

PATENT NO. : 6,856,611 B2
DATED : February 15, 2005
INVENTOR(S) : Chaudhuri et al.

It is certified that error appears in the above-identified patent and that said Letters Patent is hereby corrected as shown below:

Title page,
Item [74], please replace with:
-- [74] *Attorney, Agent, or Firm* - Philip R. Wadsworth; Charles D. Brown; George C. Pappas --

Signed and Sealed this

Ninth Day of August, 2005

JON W. DUDAS
*Director of the United States Patent and Trademark Office*